G. W. COLLINS.
Apple-Butter Stirrers.

No. 142,208. Patented August 26, 1873.

WITNESSES:
Jas. E. Hutchinson
C. H. Isham

INVENTOR.
George W. Collins by
C. S. Whitman, Atty

UNITED STATES PATENT OFFICE.

GEORGE W. COLLINS, OF WEST LEBANON, PENNSYLVANIA.

IMPROVEMENT IN APPLE-BUTTER STIRRERS.

Specification forming part of Letters Patent No. 142,208, dated August 26, 1873; application filed June 5, 1873.

*To all whom it may concern:*

Be it known that I, GEORGE W. COLLINS, of West Lebanon, county of Indiana and State of Pennsylvania, have invented an Improved Implement for Stirring Apple-Butter. The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new, and are desired to be secured by Letters Patent of the United States.

My invention relates to that class of implements which are made use of for the purpose of stirring preserves, apple-butter, &c.; and the nature thereof consists in certain improvements in the construction of the same, and novel combination of parts hereinafter shown and described.

Figure 1:
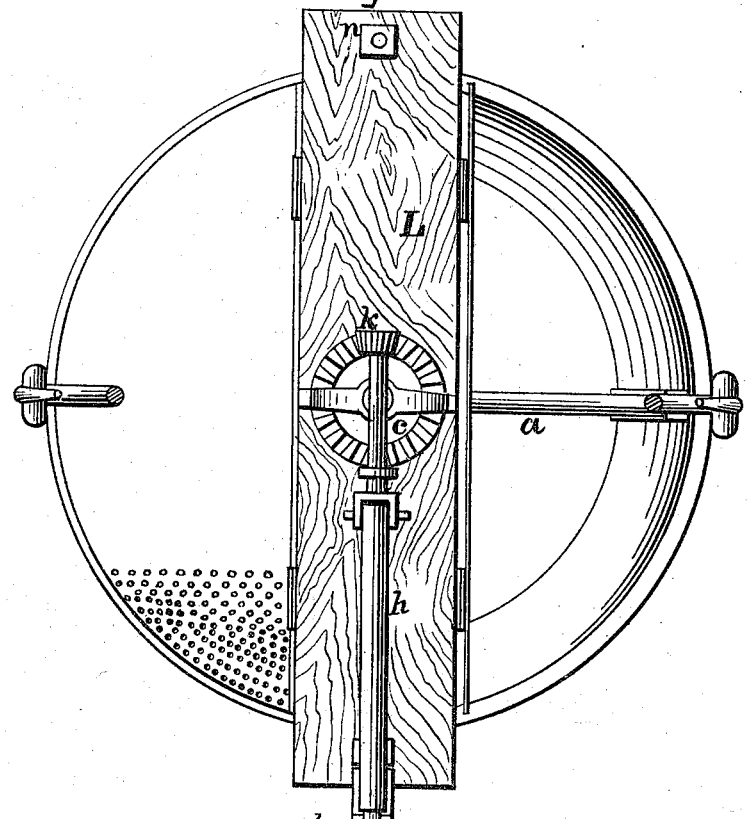
Figure 2:
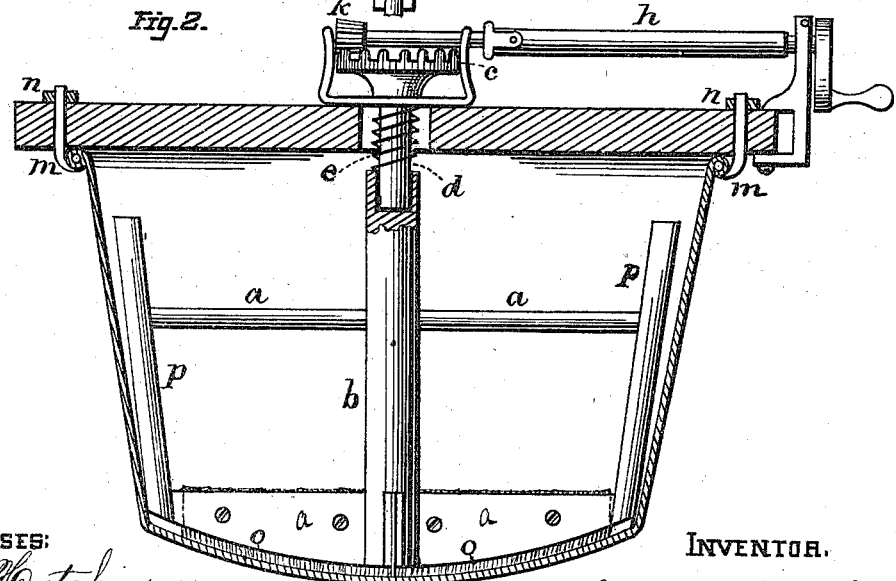

In the accompanying drawing, which illustrates my invention and forms a part of the specification thereof, Figure 1 is a plan view, one lid being open. Fig. 2 is a vertical section.

Referring to the said drawing, the stirring-arms $a$ are attached to the upright shaft $b$, which is connected with the crown-wheel $c$ by a short shaft, $d$, rigidly attached to the said crown-wheel, and fitting in a slot in the top of the shaft $b$. A spiral spring, $e$, is fitted upon the shaft $d$, and presses the stirring apparatus downward. The stirring apparatus is rotated by the crank-shaft $h$, which has a pinion, $k$, which engages with the crown-wheel $c$. The cross-piece L, upon which the operating mechanism is mounted, is secured to the kettle in which the stirring apparatus is placed, by means of the hooks $m$ and nuts $n$. The arms $a$ consist of two pieces, between which are secured the scrapers $o$, which may be constructed of corn-husks or other suitable material. The upright bars $p$ extend along the sides of the kettle.

I am aware that concave rotating bars, operated by a crank, have been heretofore used in implements for stirring fruit; but

I claim and desire to secure by Letters Patent—

The combination of the arms $a$, provided with the corn-husk scrapers $o$, shafts $b$ and $d$, wheel $c$, spring $e$, crank-shaft $h$, pinion $k$, and cross-piece L, all operating together as and for the purposes described.

In testimony that I claim the foregoing I have hereunto set my hand this 24th day of March, 1873.

GEORGE W. COLLINS.

Witnesses:
JOSEPH H. FULTON,
ALEX. C. REED.